United States Patent
Kim et al.

(10) Patent No.: US 9,538,554 B2
(45) Date of Patent: Jan. 3, 2017

(54) RANDOM ACCESS METHOD AND RANDOM ACCESS CHANNEL STRUCTURE IN MOBILE COMMUNICATION SYSTEM HAVING LARGE CELL RADIUS

(71) Applicant: Electronics and Telecommunications Research Institute, Daejeon (KR)

(72) Inventors: Hee Wook Kim, Daejoen (KR); Kun Seok Kang, Daejeon (KR); Bon Jun Ku, Daejeon (KR); Do Seob Ahn, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/399,903

(22) PCT Filed: Dec. 10, 2012

(86) PCT No.: PCT/KR2012/010701
§ 371 (c)(1),
(2) Date: Nov. 7, 2014

(87) PCT Pub. No.: WO2013/168870
PCT Pub. Date: Nov. 14, 2013

(65) Prior Publication Data
US 2015/0146631 A1    May 28, 2015

(30) Foreign Application Priority Data

May 8, 2012  (KR) .................. 10-2012-0048414
Nov. 5, 2012  (KR) .................. 10-2012-0124227

(51) Int. Cl.
*H04W 4/00*   (2009.01)
*H04W 74/08*   (2009.01)
(Continued)

(52) U.S. Cl.
CPC ............ *H04W 74/0833* (2013.01); *H04L 5/00* (2013.01); *H04W 28/04* (2013.01); *H04W 72/04* (2013.01); *H04W 72/12* (2013.01)

(58) Field of Classification Search
USPC .................. 370/252, 328, 329, 336
See application file for complete search history.

(56) References Cited

U.S. PATENT DOCUMENTS

2011/0002401 A1*  1/2011  Hao ................... H04W 74/002
                                                     375/259
2011/0292816 A1*  12/2011 Lee ....................... H04W 16/24
                                                     370/252

(Continued)

FOREIGN PATENT DOCUMENTS

JP      2011-188475 A      9/2011
KR   10-2008-0015355 A     2/2008
(Continued)

OTHER PUBLICATIONS

International Search Report for PCT/KR2012/010701 filed on Dec. 10, 2012.

*Primary Examiner* — Phuongchau Ba Nguyen

(57) ABSTRACT

A random access method in a mobile communication system, the random access method for supporting random access with a cell size of about 100 kilometers (km) or more and a power limited terminal, and a preamble structure thereof are provided. While a conventional long term evolution (LTE) random access preamble sequence is reused, a difference in a round-trip delay time between terminals in a large cell area may be compensated. Additionally, since higher power transmission is achieved per bandwidth, a higher link margin may be secured. Also, compatibility with resource scheduling of the conventional LTE may be maintained. Random access may be supported in a large cell, and (Continued)

a preamble structure of a satellite mobile communication may be implemented based on terrestrial LTE.

8 Claims, 8 Drawing Sheets

(51) Int. Cl.
*H04W 28/04* (2009.01)
*H04L 5/00* (2006.01)
*H04W 72/04* (2009.01)
*H04W 72/12* (2009.01)

(56) References Cited

U.S. PATENT DOCUMENTS

| | | | |
|---|---|---|---|
| 2008/1007445 | * | 1/2012 | Lee .................. H04W 74/004 370/328 |
| 2012/0099532 A1* | | 4/2012 | Lee .................. H04W 74/004 370/328 |
| 2013/0201910 A1* | | 8/2013 | Bergstrom .............. H04L 5/001 370/328 |
| 2008/0693412 | * | 4/2014 | Jarni .................... H04W 74/00 370/329 |
| 2014/0112254 A1* | | 4/2014 | Lindoff ............. H04W 74/0833 370/328 |
| 2015/0365978 A1* | | 12/2015 | Kim .................. H04W 74/0833 370/329 |
| 2015/0373743 A1* | | 12/2015 | Kim .................. H04W 74/0833 370/329 |

FOREIGN PATENT DOCUMENTS

| | | |
|---|---|---|
| KR | 10-2010-0014387 A | 2/2010 |
| KR | 10-2010-0076017 A | 7/2010 |
| KR | 10-2011-0667086 A | 6/2011 |
| KR | 10-2012-0044198 A | 5/2012 |

* cited by examiner

RANDOM ACCESS METHOD AND RANDOM ACCESS CHANNEL STRUCTURE IN MOBILE COMMUNICATION SYSTEM HAVING LARGE CELL RADIUS

TECHNICAL FIELD

The present invention relates to a random access method in a long term evolution (LTE) based mobile communication system for supporting a random access in a cell size of 100 kilometers (km) or more and in a power limited terminal, and a preamble structure for the random access.

The present invention is carried out as a research result of a broadcasting communication infrastructure original technology development work of the Korea communication commission. [KCA-2012-12-911-01-201, Development in optimum technology for utilizing 2.1 GHz satellite frequency band for terrestrial mobile communication]

BACKGROUND ART

The present invention relates to a random access method in a long term evolution (LTE) based mobile communication system for supporting a random access having highest compatibility with conventional LTE with a cell size of 100 kilometers (km) or more and with a power limited terminal, and a preamble structure for the random access.

In the future, a mobile communication network is expected to develop for combination or cooperation between a terrestrial network and a satellite network. In the integrated satellite and terrestrial system, community between a satellite and a terrestrial wireless interface is an essential matter in consideration of cost for a terminal. In particular, considering that an LTE-based terrestrial mobile system is considered as a next generation international mobile telecommunication (IMT)-advanced system, there is a great demand for research on an LTE-based satellite wireless interface which has an even larger cell size and longer round-trip delay (RTD) compared to those of a terrestrial network, and considers a power limited satellite network environment.

To help cell search which is a process for synchronization with a cell in a network, two particular signals such as a primary synchronization signal (PSS) and a secondary synchronization signal (SSS) are transmitted to an LTE downlink. Two PSS of one frame are identical in one cell. The PSS in one cell may have three different values according to a cell identifier (ID) of a physical layer of the cell. More specifically, the three cell IDs in one cell ID group may correspond to different PSS, respectively.

In any cellular system, random access of a terminal is basically required to request a connection setup with a network. In the LTE, the random access is used for a few purposes as follows.

- To form a wireless link as an initial connection (move from Radio Resource Control(RRC)_IDLE to RRC_CONNECTED)
- To form a wireless link again after the wireless link fails
- To establish uplink synchronization with a new cell as a handover
- To establish uplink synchronization when uplink or downlink data arrives in a state in which a terminal is in an RRC_CONNECTED state but uplink synchronization is not established
- To request for scheduling when scheduling request resources designated on a physical uplink control communication (PUCCH) are absent In all cases above, a main purpose of the random access is establishment of uplink synchronization at an initial connection. Also, the random access is performed to allocate Cell Radio Network Temporary identifier (C-RNTI) which is an only identifier of the terminal.

A main purpose of transmitting a preamble is in informing a base station that random access has been tried and helping the base station estimate a delay between the terminal and the base station. The delay is estimated to adjust uplink timing. Time-frequency resources through which the random access preamble is transmitted are called a physical random access channel (PRACH). A network broadcasts time-frequency resources available for transmission of the random access preamble to all terminals. During the random access, the terminal selects one preamble to be transmitted through the PRACH.

A length of a preamble region in a time domain is determined by preamble setup. A length of random access resources is basically 1 ms. However, a longer preamble may be set. Theoretically, an uplink scheduler of evolved node B (eNodeB) may remain a long random access region by avoiding scheduling of terminals in a plurality of consecutive subframes.

FIG. 1 illustrates a process of random access of 3rd Generation Partnership Project (3GPP) LTE selected as an international mobile telecommunication (IMT)-Advanced wireless interface technology. Referring to FIG. 1, the random access process of LTE may include four steps. In a first step, synchronization is obtained through PSS/SSS from a base station, and system information is obtained through a broadcasting channel (BCH). The information transmitted through the BCH may include parameters for generating a random access preamble. In a second step, the terminal transmits the random access preamble. Therefore, the eNodeB may estimate a transmission timing of the terminal. Uplink timing estimation is an indispensable process in orthogonal frequency division multiplexing (OFDM)-based LTE. Without setting synchronization, uplink data cannot be transmitted. In a third step, a parameter of the transmitted preamble is extracted from the base station. In a fourth step, the terminal having the parameter of the preamble detected from the base station transmits a preamble ID, an access permission message, and Timing_Advanced information necessary for the uplink synchronization, to inform that the uplink synchronization is obtained. Last, the terminal adjusts the Timing_Advanced information based on the signal transmitted from the base station and request resources of the base station.

FIG. 2 illustrates a random access preamble format. Referring to FIG. 2, the random access preamble currently defined by the random access process includes a cyclic prefix (CP), a preamble sequence, and a guard time (GT), and has four formats. Format 0 includes lengths of the CP and the GT of 0.1 ms, respectively. Format 0 supports a cell size of about 15 km. Format 1, Format 2, and Format 3 support a cell size of about 78 km, 30 km, and 100 km, respectively. Formats 2 and 3 transmit the preamble sequence twice to increase an energy gain. For transmission of the preamble, the GT is used to cope with uncertainty of timing. Before the random access begins, the terminal obtains downlink synchronization from a cell search process. However, before the uplink synchronization is established, location of the terminal in the cell is not yet known and therefore uplink timing is still uncertain. According to an increase in the cell size, the uncertainty of the uplink timing is increased. To take the uncertainty into consideration and avoid interference with following subframes unused for the random access, the GT may be used as part of the preamble transmission. For this purpose, the GP needs to be set larger than a sum of a RTD time difference between a nearest terminal and a farthest terminal with respect to the eNodeB and a multipath preamble delay time. In case of Format 4 having a longest GT, a cell size is 100 km or less. Therefore, in a mobile communication network having a cell size of 100 km or greater, such as a satellite mobile communication network, a conventional preamble format may not solve the uncertainty of uplink timing and the interference with the following subframes.

When the preamble includes the CP, it is efficient since the base station may process a low-complexity frequency domain. For this, a length of the CP needs to be greater than the RTD time difference between the nearest terminal and the farthest terminal with respect to the eNodeB, and may be almost equal to the length of the GT. Since any uplink transmission is not scheduled with respect to the subframes following the random access resources, a protection region larger than as shown in FIG. 2 may be generated. Therefore, when the cell size is about 100 km or more as in the satellite mobile communication network, frequency domain processing through one time of fast Fourier transform (FFT) window is impossible since the RTD time difference between terminals exceeds the length of the CP. Accordingly, time domain processing needs to be performed using a plurality of windows. As a result, complexity of a receiver and a preamble obtaining time is increased.

Finally, in the satellite mobile communication network, high output signal transmission is necessitated due to a small link margin. Considering a maximum transmission power level of a handheld terminal, which is relatively low, a transmission band width of 1 MHz or more of the uplink random access preamble in the LTE may not provide transmission power satisfying the link margin of the satellite system, by power allocated from respective subcarriers of a transmission block. Furthermore, since the lengths of GT and CP, which are considered to support a mobile communication network having a large cell area, need to be increased than in the conventional LTE, an entire preamble length needs to be increased on a time axis. Considering that the preamble bandwidth of the conventional LTE is 1 MHz or greater, the increase in the preamble length on the time axis may cause reduction in data transmission resources.

DISCLOSURE OF INVENTION

Technical Goals

An aspect of the present invention provides a random access method capable of processing of a low-complexity frequency domain while maintaining compatibility with conventional long term evolution (LTE) in a mobile communication network having a large cell area and a power limited environment, such as a satellite mobile communication network, and a preamble channel structure for the random access.

Another aspect of the present invention provides a random access method in an LTE-based mobile communication system for increasing system performance while maintaining compatibility with conventional LTE as much as possible, with a cell size of about 100 kilometers (km) or larger and with a power limited terminal, and a preamble structure for the random access.

Another aspect of the present invention provides reduction in uncertainty of uplink timing caused when a conventional terrestrial LTE system is applied to a satellite mobile system.

Another aspect of the present invention provides a preamble structure including a cyclic prefix (CP), for solving an increase in receiver complexity and preamble obtaining time caused when a round-trip delay time difference between terminals exceeds a length of the CP when a cell size is 100 km or more, by providing the preamble structure implementing a guard time (GT) proper for a satellite mobile system.

Another aspect of the present invention provides transmission power satisfying a satellite mobile system in which high output signal transmission is necessary due to a small link margin, and provides reduction in data transmission resources caused by an increase in lengths of a GT and a CP due to a large cell area.

Technical Solutions

According to an aspect of the present invention, there is provided a random access channel generation method in a mobile communication system having a large cell area, the method including (a) a terminal determining a cell size, (b) the terminal setting a subcarrier interval of a random access channel to be 1/n times a subcarrier interval of a terrestrial long term evolution (LTE) data channel and a terrestrial LTE random access channel, when the cell size exceeds a predetermined reference, wherein n denotes a positive number greater than 1, and (c) the terminal setting a length of a random access preamble to be m times a length of a terrestrial LTE subframe, wherein m denotes a positive number greater than 1.

The random access preamble may include a random access preamble sequence, a cyclic prefix (CP), and a guard time (GP).

According to an aspect of the present invention, there is provided a random access channel generation apparatus in a mobile communication system having a large cell area, the apparatus including a determination unit to determine a cell size, a first set unit to set a subcarrier interval of a random access channel to be 1/n times a subcarrier interval of a terrestrial long term evolution (LTE) data channel and a terrestrial LTE random access channel, when the cell size determined by the determination unit exceeds a predetermined reference, wherein n denotes a positive number greater than 1, and a second set unit to set a length of a random access preamble to be m times a length of a terrestrial LTE subframe, wherein m denotes a positive number greater than 1.

The random access preamble may include a random access preamble sequence, a CP, and a GP.

Particularities of other embodiments are included in the detailed description and drawings.

Effects

According to an embodiment of the present invention, whereas a conventional long term evolution (LTE) random access preamble sequence is reused, a difference in a round-trip delay (RTD) time between terminals in a large cell area may be compensated. Additionally, a bandwidth of a random access channel according to the embodiment of the present invention is almost ⅓ of a bandwidth of a conventional random access channel and therefore is capable of transmitting higher power per bandwidth in a power limited terminal. As a result, a higher link margin may be secured. Furthermore, since ⅓ of a remaining channel bandwidth may be used for a minimum resource allocation block of the conventional LTE, compatibility with resource scheduling of the conventional LTE may be maintained. Also, random access may be supported in a large cell, and a preamble structure of a satellite mobile communication may be implemented based on terrestrial LTE. Consequently, a large cell structure may be supported even in a low power terminal. In addition, compatibility between the terrestrial LTE and LTE-based satellite mobile communication may be secured.

BEST MODE FOR CARRYING OUT THE INVENTION

To accomplish the foregoing object of the present invention, there is a suggested a narrow bandwidth random access channel structure in a mobile communication system having a large cell area, which is capable of compensating for a difference in a round-trip delay (RTD) time between terminals in a large cell area while reusing a random access preamble sequence of a conventional long term evolution (LTE), and capable of securing a link margin in a power limited environment, and a random access method using the narrow bandwidth random access channel structure.

According to an embodiment of the present invention, there is provided a random access channel generation method in a mobile communication system having a large cell area including (a) a terminal determining a cell size, (b) the terminal setting a subcarrier interval of a random access channel to be 1/n times a subcarrier interval of a terrestrial LTE data channel and a terrestrial LTE random access channel, when the cell size exceeds a predetermined reference, wherein n denotes a positive number greater than 1, and (c) the terminal setting a length of a random access preamble to be m times a length of a terrestrial LTE subframe, wherein m denotes a positive number greater than 1.

It is preferred that the random access preamble includes a random access preamble sequence, a cyclic prefix (CP), and a guard time (GP).

According to an embodiment of the present invention, there is also provided a random access channel generation apparatus in a mobile communication system having a large cell area, the apparatus including a determination unit to determine a cell size, a first set unit to set a subcarrier interval of a random access channel to be 1/n times a subcarrier interval of a terrestrial LTE data channel and a terrestrial LTE random access channel, when the cell size determined by the determination unit exceeds a predetermined reference, wherein n denotes a positive number greater than 1, and a second set unit to set a length of a random access preamble to be m times a length of a terrestrial LTE subframe, wherein m denotes a positive number greater than 1.

Here, it is preferred that the random access preamble includes a random access preamble sequence, a CP, and a GP.

Reference will now be made in detail to embodiments of the present invention, examples of which are illustrated in the accompanying drawings. The embodiments will be described with respect to an LTE-based satellite longitudinal mode system. However, the method of the present invention may be applied to any other mobile communication systems having a large cell area.

Figure 1:
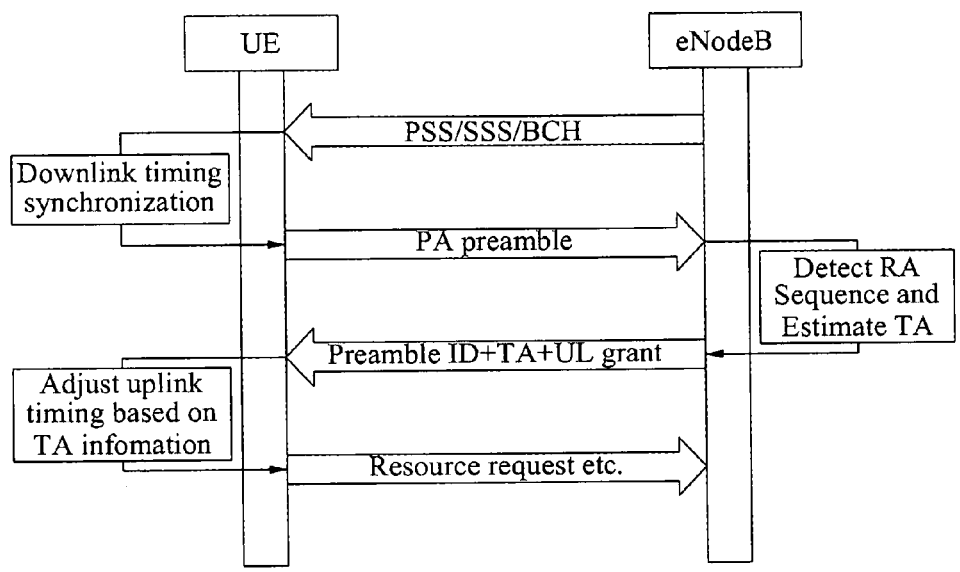
FIG. 1 is a diagram illustrating a random access process of 3rd generation Partnership Project (3GPP) LTE selected as an international mobile telecommunication (IMT)-Advanced wireless interface technology, according to a conventional art.
Figure 2:
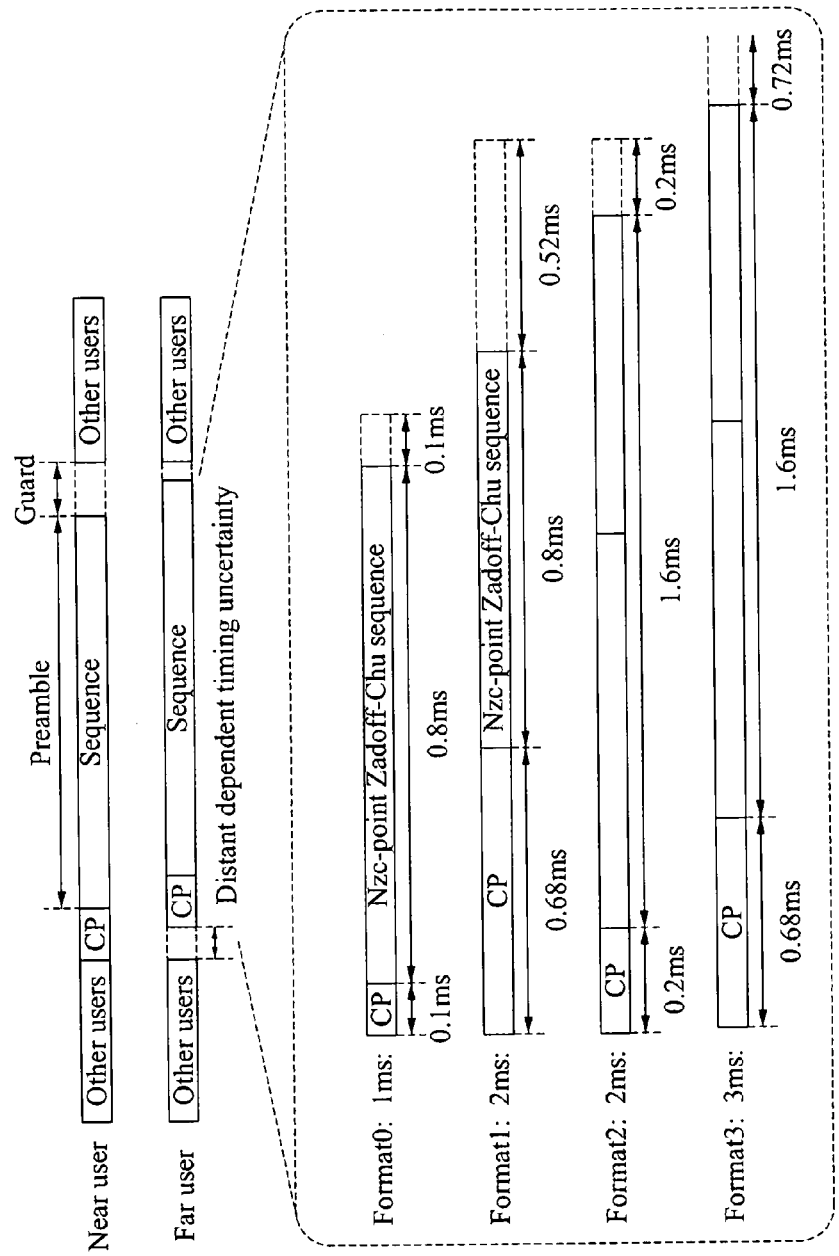
FIG. 2 is a diagram illustrating a random access preamble format according to a conventional art.
Figure 3:
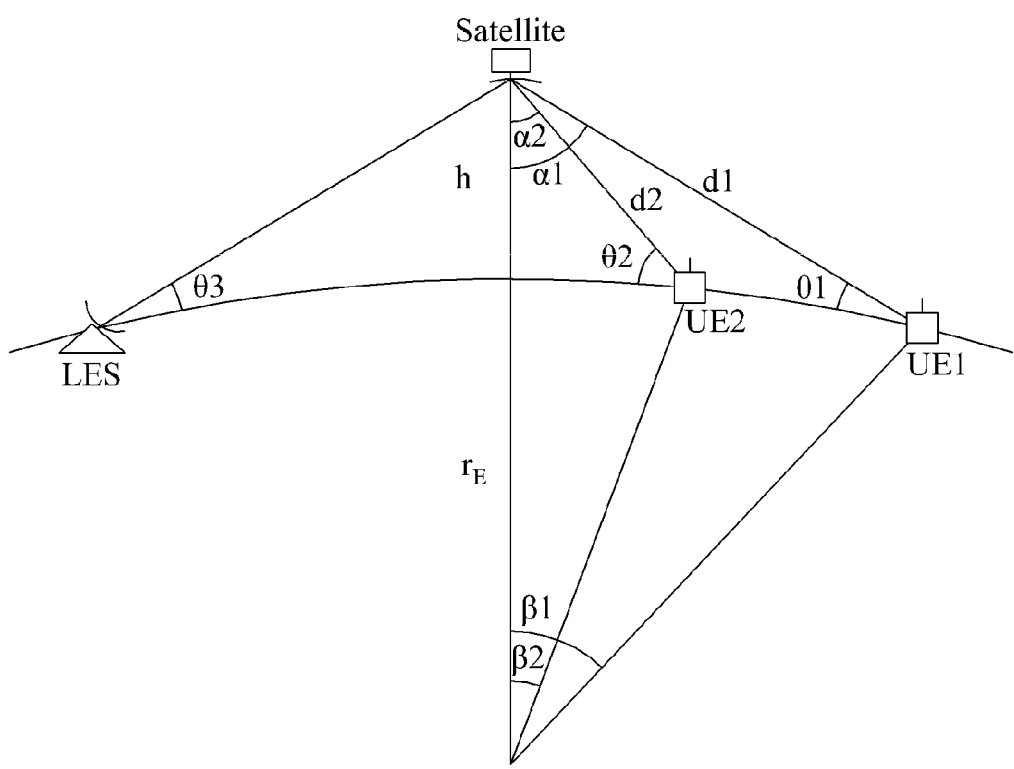
FIG. 3 is a diagram illustrating a difference in a propagation delay time according to locations of a satellite and a terminal in one spot beam coverage, according to an embodiment of the present invention.

FIG. 3 is a diagram illustrating a difference in a propagation delay time according to locations of a satellite and a terminal in one spot beam coverage, according to an embodiment of the present invention. Referring to FIG. 3, an exemplary embodiment of the present invention will be described/

Parameters of FIG. 3 are defined as follows.
h: Satellite height
$r_E$: Earth radius
d: Satellite-terminal distance
α: Angle between a vertical reference surface of a satellite and a position of a terminal
β: Angle between a vertical reference surface of a center of earth and a position of a terminal
θ: Elevation angle at a terminal or an earth station Presuming that a land earth station (LES) and a user equipment (UE) 1 are located at a boundary of a satellite coverage and a UE 2 is located in an innermost location of a largest spot beam coverage in FIG. 3, a propagation delay time $t_1$ and $t_2$ between satellites and terminals and a delay time difference $\Delta t_{1,2}$ with respect to UE1 and UE2 may be obtained by following equations using the above-described parameters.

First, when $\theta_1$, $\beta_1$, $\alpha_{1,2}$, and $\beta_{1,2}$ are defined as follows:
$\theta_1$: Minimum elevation angle
$\beta_1$: Satellite coverage angle
$\alpha_{1,2} = \alpha_1 - \alpha_2$: Spot beam angle having maximum value
$\beta_{1,2} = \beta_1 - \beta_2$: Spot beam coverage angle having maximum value Relations between the coverage angle and the elevation angle may be expressed as $$\beta_i = \arccos\left(\frac{r_E}{r_E + h}\cos\theta_i\right) - \theta_i.$$

A spot beam coverage diameter $s_{1,2}$ according to a ground surface with respect to a maximum spot beam may have relations with the maximum spot beam coverage $\beta_{1,2}$ as follows.

$$s_{1,2} = 2\pi r E \frac{\beta_{1,2}}{360°}$$

A distance between each terminal and each satellite may be expressed by a following equation.

$$d_i = \sqrt{r_E^2 + (r_E+h)^2 + 2r_E(r_E+h)\cos\beta_1}$$

When the distance d between satellite and the terminal is calculated using the above equation with the satellite height h, the elevation angle $\theta_1$, the beam coverage diameter $s_{1,2}$, and the earth radius $r_E$, the propagation delay time $t_i$ may be expressed as $t_i = d_i/c$. Here, c denotes a propagation speed and the propagation time difference may be obtained using $\Delta t_{1,2} = t_1 - t_2$.

The propagation time difference may be varied according to the satellite height and the spot beam coverage. Considering a geosynchronous earth orbit (GEO) satellite being considered worldwide for personal portable satellite mobile communication and the elevation angle 40° corresponding to a location of Korea, in case of a random access channel format 4 capable of supporting a largest cell in current LTE, a cell size of a terrestrial mobile communication system may be supported up to about 100 kilometers (km). However, in case of a satellite mobile communication system, the cell size may be supported up to about 75 km. In case of the satellite mobile communication system, the entire system capacity may be maximized by minimizing a multi beam. Also, considering that data transmission capacity is increased according to a decrease in the CP and the GT in a random access channel, lower size of the satellite beam may be more efficient. Therefore, in the LTE-based mobile communication network, the random access channel needs to support a cell size of about 150 km to about 200 km achievable by a current satellite antenna technology. That is, considering the GEO satellite and the elevation angle 40° of Korea, a RTD time 1.8 ms between a nearest terminal and a farthest terminal with respect to a satellite base station needs to be supported by the random access channel. Therefore, the length of the random access preamble and the length of the CP need to be about 1.8 ms or more.

To increase the preamble length on a time axis, to reduce a bandwidth of the random access channel to take the power limited satellite environment into consideration, and to reuse the conventional LTE preamble sequence directly, a subcarrier intervals of the suggested random access channel needs to be reduced in comparison to a subcarrier interval of the conventional random access channel. Here, to minimize loss of orthogonality between the preamble subcarrier and a data subcarrier and facilitate implementation by reuse of an existing fast Fourier transform (FFT)/inverse (IFFT) block physical uplink shared channel (PUSCH) data, the subcarrier interval for PUSCH data needs to be a positive number times a random access channel subcarrier interval. That is, the subcarrier interval of the suggested random access channel may be designed to be 1/n times a data channel subcarrier interval of the conventional LTE and a random access channel subcarrier interval of the conventional LTE. Here, n denotes a positive number greater than 1.

Accordingly, when a sequence length of a random access preamble format 1 of the conventional LTE is 800 us, a minimum length greater than the RTD time difference 1.83 ms in the large cell while being the positive number times the length 800 us is 2.4 ms. Therefore, when the sequence length of the random access preamble having the large cell area is defined to be 2.1 ms, this length is 36 times the random access channel subcarrier interval suggested by the conventional data subcarrier interval, and 3 times the random access subcarrier interval suggested by the random access channel interval of the conventional LTE, that is, the positive number times. Accordingly, orthogonality with conventional channels may be maintained and the FFT and IFFT blocks of the conventional LTE may be reused. Furthermore, when designed as foregoing, the bandwidth of the suggested random access channel is about ⅓ of the conventional random access channel bandwidth. That is, higher power may be transmitted per bandwidth in a power limited terminal. Consequently, a higher link margin may be secured. ⅓ of the remaining channel bandwidth corresponding to two resource blocks for the conventional data channel may correspond to a minimum resource allocation block of the conventional LTE. Therefore, the suggested random access channel may be implemented while maintaining compatibility with resource scheduling of the conventional LTE.

Next, the length of the GT needs to be about 1.8 ms or more to secure uncertainty of the RTD time. The length of the CP needs to be greater than or equal to a sum of the RTD time difference and a multipath channel delay time. In case of the satellite, the multipath channel delay time may be considered zero since communication is performed in a line of sight environment, and therefore the lengths of the CP and the GT may be similar. For compatibility between the suggested random access channel and the conventional LTE, the random access channel needs to operate in a conventional LTE frame structure. Therefore, the length of the random access channel (preamble) needs to be a positive number m times of a length of an LTE subframe, that is, 1 ms. Here, m is a positive number greater than 1. Since the sequence length of the random access channel is 2.4 ms, when the lengths of the CP and the GT are about 1.8 ms, the length of the random access channel may correspond to 6 ms, that is, 6 times the length of the subframe. For easy implementation, the length of the CP may be a positive number times the conventional LTE random access channel format. Therefore, the length of the CP may be defined to be 9 times the length of the CP of the conventional LTE random access channel format 2, corresponding to about 1.8 ms. In addition, out of 6 ms of random access channel length, a remaining length excluding 2.4 ms of the sequence length and the CP length may be defined as the GT.

Conversely, when the cell size is relatively large and the terminal can not transmit data with sufficient power, a link margin for the random access may not be secured. Preparing for such a case, another random access channel format may be defined, corresponding to twice the sequence length. Accordingly, the random access channel sequence length of the format becomes 4.8 ms. Since the random access channel sequence length of the format is 4.8 ms, when the lengths of the CP and the GT are about 2.1 ms, the random access channel length becomes 9 ms corresponding to 9 times the subframe length. For easy implementation, the length of the CP may be a positive number times the conventional LTE random access channel format. Therefore, the length of the CP may be defined to be 9 times the length of the CP of the conventional LTE random access channel format 2, corresponding to about 1.8 ms. In addition, out of 9 ms of random access channel length, a remaining length excluding 4.8 ms of the sequence length and the CP length may be defined as the GT.

Figure 4:
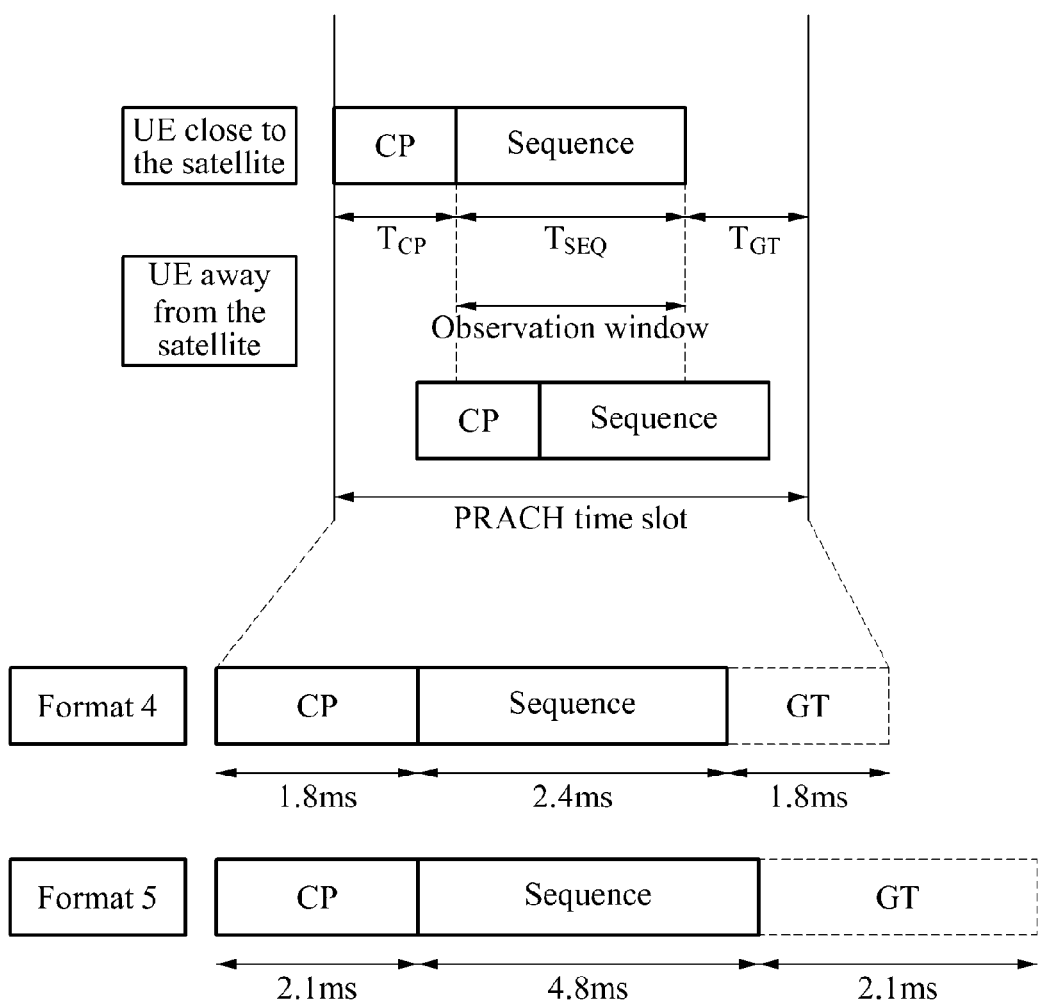
FIG. 4 is a diagram illustrating a random access channel structure according to an embodiment of the present invention.

FIG. 4 is a diagram illustrating a random access channel structure according to an embodiment of the present invention.

Table 1 defines random access channel parameters shown in FIG. 4. Here, Ts denoting a sampling period may be defined as Ts=1/(15000×2048).

TABLE 1

| Preamble format | $T_{CP}$ | $T_{SEQ}$ |
| --- | --- | --- |
| 4 | 9 × 6240 Ts (1.8 ms) | 3 × 24576 Ts (2.4 ms) |
| 5 | 3 × 21024 Ts (2.1 ms) | 6 × 24576 Ts (4.8 ms) |

A frequency multiplexing method of the suggested random access channel preamble with respect to the conventional LTE transmission block for operation without interference while maintaining compatibility with the conventional LTE transmission block may be expressed by a following equation.

$$n_{PRB}^{RA} = \begin{cases} n_{PRBoffset}^{RA} + 2\left\lfloor \frac{f_{RA}}{2} \right\rfloor, & \text{if } f_{RA} \bmod 2 = 0, \\ N_{RB}^{UL} - 2 - n_{PRBoffset}^{RA} - 2\left\lfloor \frac{f_{RA}}{2} \right\rfloor, & \text{otherwise,} \end{cases} \quad [\text{Equation 1}]$$

Here, $N_{RB}^{UL}$ denotes a number of uplink transmission resource blocks, and $n_{PRB}^{RA}$ denotes a resource block first allocated for PRACH, which is defined by $0 \leq n_{PRBoffset}^{RA} \leq N_{RB}^{UL} - 6$ defined by an upper layer.

In basic LTE, the random access preamble is generated from Zadoff-Chu sequence having a length of 839. The suggested random access channel also reuses the Zadoff-Chu sequence of the conventional LTE to maintain compatibility with the basic LTE and to reduce cost for a terminal chip set. To transmit the random access preamble based on the Zadoff-Chu sequence in about ⅓ bandwidth of a general conventional bandwidth, a random access channel signal may be transmitted as follows.

$$s(t) = \beta_{PRACH} \sum_{k=0}^{N_{ZC}-1} \sum_{n=0}^{N_{ZC}-1} x_{u,v}(n) \cdot e^{-j\frac{2\pi nk}{N_{ZC}}} \cdot e^{j2\pi\left(k+\varphi+K\left(k_0+\frac{1}{2}\right)\right)\Delta f_{RA}(t-T_{CP})}, \quad [\text{Equation 2}]$$

Here, t is in a range of $0 \leq t \leq T_{SEQ} + T_{CP}$, $\beta_{PRACH}$ denotes a magnitude control index for determining transmission power, and $x_{u,v}(n)$ denotes the random access preamble sequence. Also, $k_0 = n_{PRB}^{RA} N_{sc}^{RB} - N_{RB}^{UL} N_{sc}^{RB}/2$ satisfied. In a frequency domain, the location is controlled by a parameter $n_{PRB}^{RA}$ which is a physical resource block first allocated for the PRACH defined by the upper layer. In addition, $K = \Delta f / \Delta f_{RA}$ denotes a difference between subcarrier intervals for the suggested random access and for uplink data transmission. A parameter $\Delta f_{RA}$ denoting the subframe interval of the suggested random access preamble and an offset value φ determining a frequency domain location of the random access preamble in the physical resource block are defined as in Table 2 so that compatibility with the conventional data transmission block and orthogonality are maintained.

TABLE 2

| Preamble format | $\Delta f_{RA}$ | φ |
| --- | --- | --- |
| 5-6 | 416.67 Hz | −6 |

Figure 5:
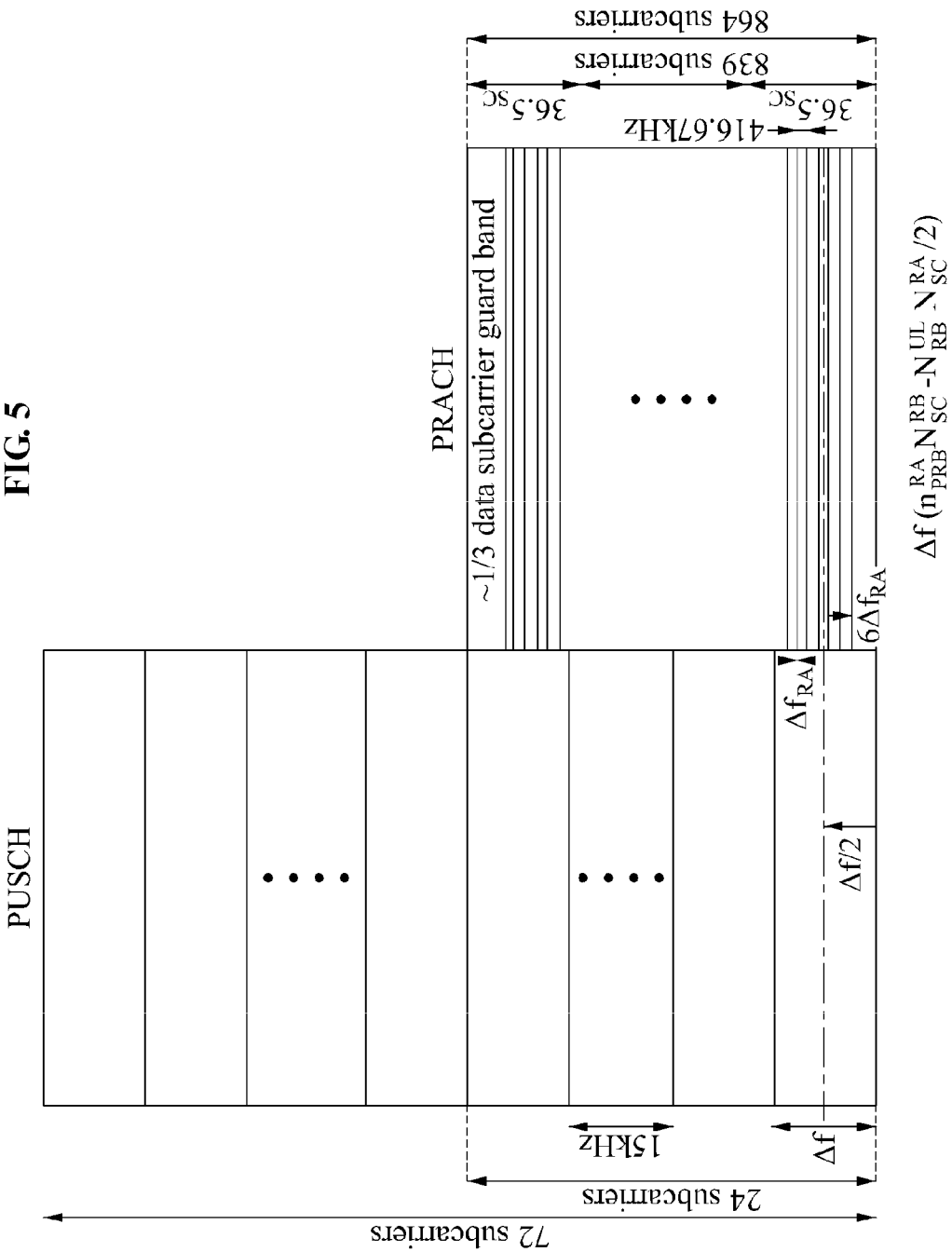
FIG. 5 is a diagram illustrating a suggested random access preamble being mapped with a conventional data transmission block, according to an embodiment of the present invention.
Figure 6:
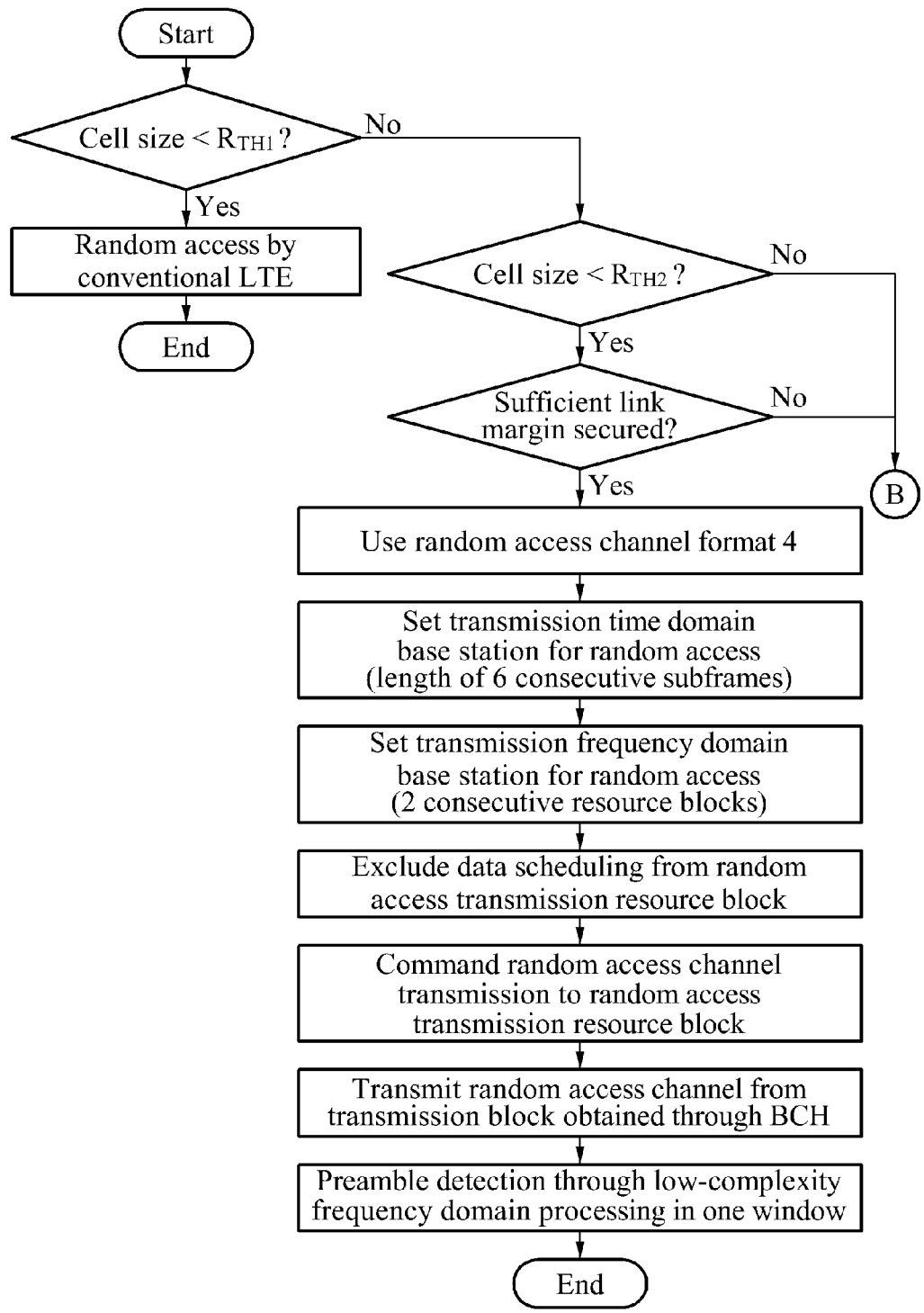
FIG. 6 is a diagram illustrating a process of transmitting and receiving a random access channel by suggested random access channel formats 4 and 5, according to an embodiment of the present invention.
Figure 7:
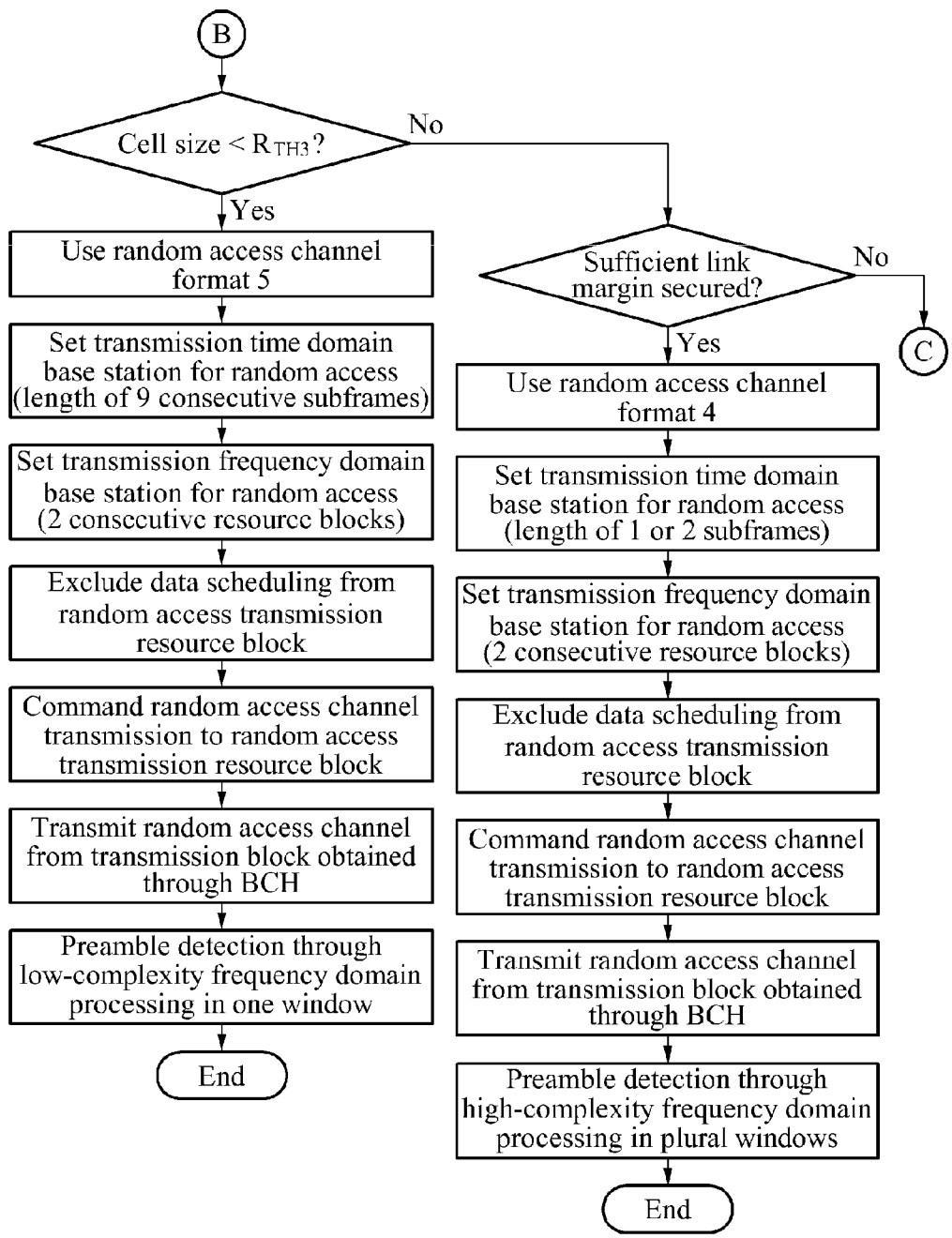
FIG. 7 is a diagram illustrating a process connected to B of FIG. 6.
Figure 8:
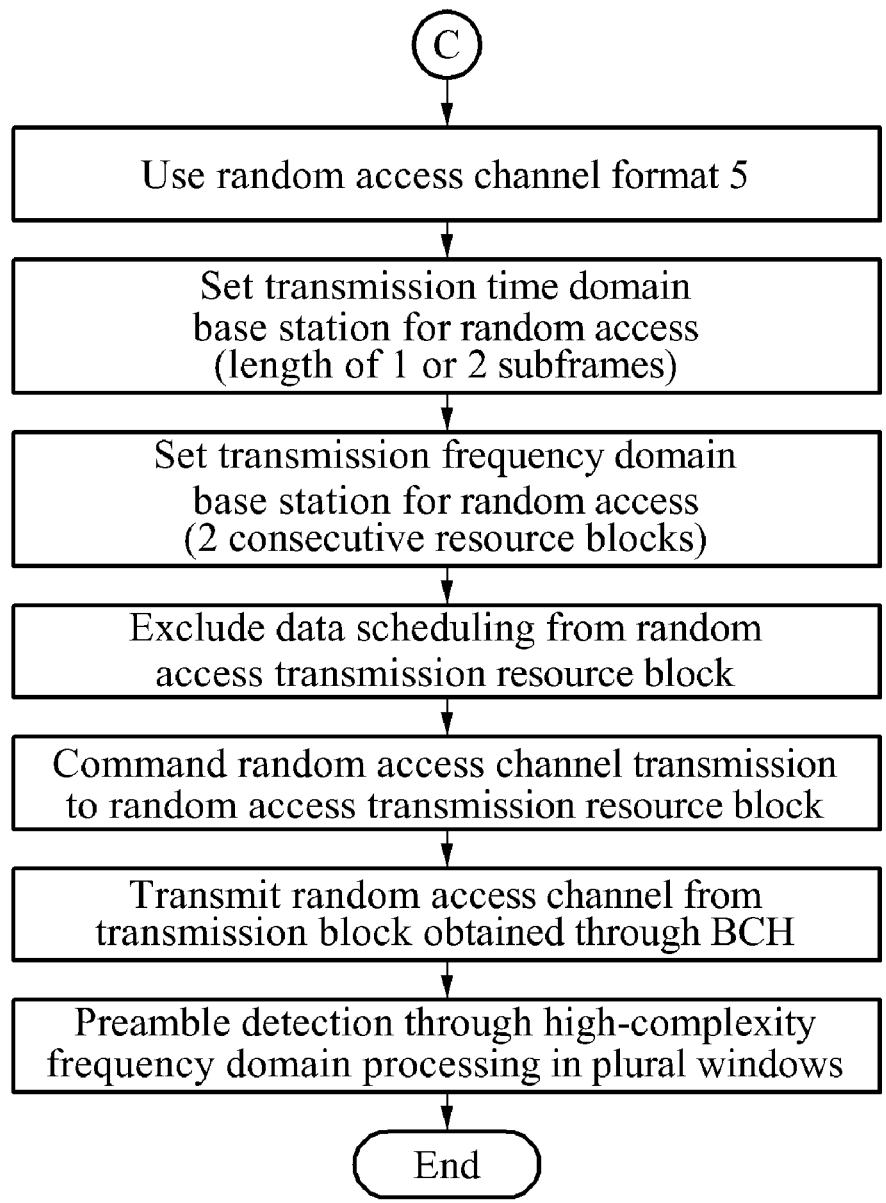
FIG. 8 is a diagram illustrating a process connected to C of FIG. 7.

FIG. 5 is a diagram illustrating a suggested random access preamble being mapped with a conventional data transmission block, according to an embodiment of the present invention. FIGS. 6 to 8 are diagrams illustrating a process of transmitting and receiving a random access channel with suggested random access channel formats 4 and 5. Referring to FIGS. 5 to 8, when $R_{TH1}$ denotes a cell size enabling operation with a conventional random access channel format, when the cell size is $R_{TH1}$ or less, the operation is available with the conventional random access channel format. Therefore, the random access channel transmission and reception may be performed according to the conventional LTE method with conventional formats 0, 1, 2, and 3. In the foregoing satellite mobile communication network, the $R_{TH1}$ may be 75 km. However, when the cell size is greater than or equal to $R_{TH1}$, random access preamble reception through low-complexity frequency domain processing and system capacity reduction are caused. To this end, the suggested random access channel formats 5 and 6 may be used. When $R_{TH2}$ denotes a cell size corresponding to the RTD time difference between terminals of maximum 1.8 ms, when a sufficient link margin between the satellite and the terminals is secured, the format 4 may be used for the random access. In case of the random access channel of the format 4, a frequency domain has a bandwidth corresponding to 2RB and a time domain has a time domain corresponding to 6 subframes. Therefore, a base station may allocate a transmission resource block corresponding to the format 4 for the random access channel. The base station may schedule data transmission in other than the resource block allocated for the random access channel. The transmission resource for the random access channel, allocated by the base station, may be received to the terminal through a broadcasting channel (BCH). The terminal may transmit an uplink random access signal in the allocated transmission block based on corresponding information. The signals transmitted by respective terminals all arrive within a CP block of the format 4 in the base station. Therefore, preamble detection is performed through the low-complexity frequency domain processing in one FFT by reusing a preamble detection method of the conventional LTE. Conversely, when a sufficient link margin between the satellite and the terminals is not guaranteed, the random access uses the format 5. According to the random access channel of the format 5, the frequency domain has a bandwidth corresponding to 2RB and the time domain has a time domain corresponding to 9 subframes. Therefore, the base station may allocate a transmission resource block corresponding to the format 5 for the random access channel. The base station may schedule data transmission in other than the resource block allocated for the random access channel. The transmission resource for the random access channel, allocated by the base station, may be received to the terminal through the BCH. The terminal may transmit the uplink random access signal in the allocated transmission block based on corresponding information. The signals transmitted by respective terminals all arrive within a CP block of the format 5 in the base station. Therefore, preamble detection is performed through the low-complexity frequency domain processing in one FFT by reusing a preamble detection method of the conventional LTE. The suggested format 5 may be used in the same manner even when the RTD time difference between terminals is less than or equal to a cell size $R_{TH3}$ corresponding to maximum 2.1 ms.

However, when the round-trip delay time difference exceeds the cell size $R_{TH3}$, the random access signal transmitted by the terminals may be received out of the CP block. Therefore, the frequency domain processing may not be performed in one window. In this case, preamble detection is performed through high-complexity time domain processing in a plurality of windows.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The computer readable recording medium may include any data storage device that can store data which can be thereafter read by a computer system or processing device. Examples of the computer readable recording medium include read-only memory (ROM), random-access memory (RAM), CD-ROMs, magnetic tapes, floppy disks, optical data storage devices. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

The invention claimed is:

1. A random access channel generation method in a mobile communication system having a large cell area, the method comprising:
   determining, by a terminal, a cell size;
   determining, by the terminal, a subcarrier interval of a random access channel to be 1/n times a subcarrier interval of a terrestrial long term evolution (LTE) data channel and a terrestrial LTE random access channel, when the cell size exceeds a predetermined reference value, wherein n denotes a positive number greater than 1; and
   generating, by the terminal, a random access preamble having a length that is m times a length of a terrestrial LTE subframe when the cell size exceeds the predetermined reference value, wherein m denotes a positive number greater than 1.

2. The random access channel generation method of claim 1, wherein the random access preamble comprises a random access preamble sequence, a cyclic prefix (CP), and a guard time (GP).

3. A random access channel generation apparatus of a terminal in a mobile communication system having a large cell area, the apparatus comprising:
   a storage; and
   a processor coupled to the storage, wherein instructions in the storage configure the processor to:
      a cell size;
      determine a subcarrier interval of a random access channel to be 1/n times a subcarrier interval of a terrestrial long term evolution (LTE) data channel and a terrestrial LTE random access channel, when the cell size determined by the determination unit exceeds a predetermined reference value, wherein n denotes a positive number greater than 1; and
      generate a random access preamble having a length that is m times a length of a terrestrial LTE subframe when the cell size determined by the determination unit exceeds the predetermined reference value, wherein m denotes a positive number greater than 1.

4. The random access channel generation apparatus of claim 3, wherein the random access preamble comprises a random access preamble sequence, a cyclic prefix (CP), and a guard time (GP).

5. The random access channel generation method of claim 1, wherein the predetermined reference value corresponds to a satellite mobile communication network.

6. The random access channel generation method of claim 1, wherein the predetermined reference value corresponds to a cell size of about 100 km.

7. The random access channel generation apparatus of claim 3, wherein the predetermined reference value corresponds to a satellite mobile communication network.

8. The random access channel generation apparatus of claim 3, wherein the predetermined reference value corresponds to a cell size of about 100 km.

* * * * *